United States Patent [19]

Bass et al.

[11] 4,200,163
[45] Apr. 29, 1980

[54] HYDRAULIC ACTUATOR

[75] Inventors: Richard A. Bass, Leamington Spa; Peter S. K. Grossart, Braunston, both of England

[73] Assignee: Automotive Products Limited, Leamington Spa, England

[21] Appl. No.: 924,295

[22] Filed: Jul. 13, 1978

[30] Foreign Application Priority Data

Aug. 4, 1977 [GB] United Kingdom ............... 32671/77

[51] Int. Cl.² .............................................. B60T 17/06
[52] U.S. Cl. ..................................... 180/219; 60/588; 60/592
[58] Field of Search ............... 180/30, 33 R, 33 A; 60/592, 588, 589; 248/1; 285/184, 185; 137/376, 581; 222/185

[56] References Cited

U.S. PATENT DOCUMENTS 3,609,975  10/1971  Lewis et al. .......................... 60/592

FOREIGN PATENT DOCUMENTS 488801  12/1952  Canada ..................................... 60/588
872272  7/1961  United Kingdom ....................... 60/588
1141877  2/1969  United Kingdom ....................... 60/589

Primary Examiner—Robert R. Song
Assistant Examiner—Donn McGiehan
Attorney, Agent, or Firm—Kemon & Estabrook

[57] ABSTRACT

The invention relates to motor vehicle reservoir and master cylinder assemblies in which a hydraulic master cylinder can be mounted onto the vehicle in a large number of attitudes with respect to the vehicle without the limitation of maintaining the reservoir in an upright position. The reservoir is mounted directly onto the master cylinder by an adjustable means so that the attitude of the reservoir can be readily selectively adjusted relative to the master cylinder to ensure that the reservoir is substantially upright.

7 Claims, 7 Drawing Figures

HYDRAULIC ACTUATOR

This invention relates to hydraulic reservoir and master cylinder assemblies which are used particularly, but not exclusively, for operating brakes on a vehicle.

Hydraulic brakes for motor cycles are well known, and it is usual to have a hydraulically operated front brake and a mechanically operated rear brake. However, hydraulically operated rear brakes are known especially for the more powerful motor cyles. These rear brakes can be operated by a master cylinder which also operates the front brake, or alternatively can be operated by an independent master cylinder fed by its own hydraulic fluid reservoir.

In the latter case the master cylinder may be secured to one of the angled struts, that support the rear portion of the frame of the motor cycle. Since the attitude of the angled frame may differ from motor cycle to motor cycle it is preferable to have a master cylinder which can be adapted for fitting to the different types of frame.

According to this invention there is provided a hydraulic reservoir and master cylinder assembly including a hydraulic master cylinder having means for mounting the cylinder on a vehicle without limitation to the preservation of a given position with respect to the vehicle and a fluid reservoir mounted directly on the master cylinder by an adjustable means so that the attitude of the reservoir can be readily selectively adjusted relative to the master cylinder so as to ensure that the reservoir is substantially upright on the vehicle.

Preferably the master cylinder has a sealed seat for a fluid connection from the reservoir to the cylinder and the reservoir is rotatably adjustable on the seat.

Conveniently the seat is a flat planar face parallel with the longitudinal axis of the cylinder and the attitude of the reservoir relative to the master cylinder is altered by rotation of the reservoir about an axis normal to the face.

Conveniently the reservoir is mounted on the master cylinder and is secured thereto by a screw threaded means preferably a stud, which facilitates re-orientation of the reservoir.

Conveniently the master cylinder is for attachment to a frame of a motor cycle and the means of attachment allow the master cylinder to be easily orientated with respect to any of the types of motor cycle frame to which it is fitted.

An embodiment of the invention will now be described by way of example and with reference to the following drawings in which.

Figure 1:
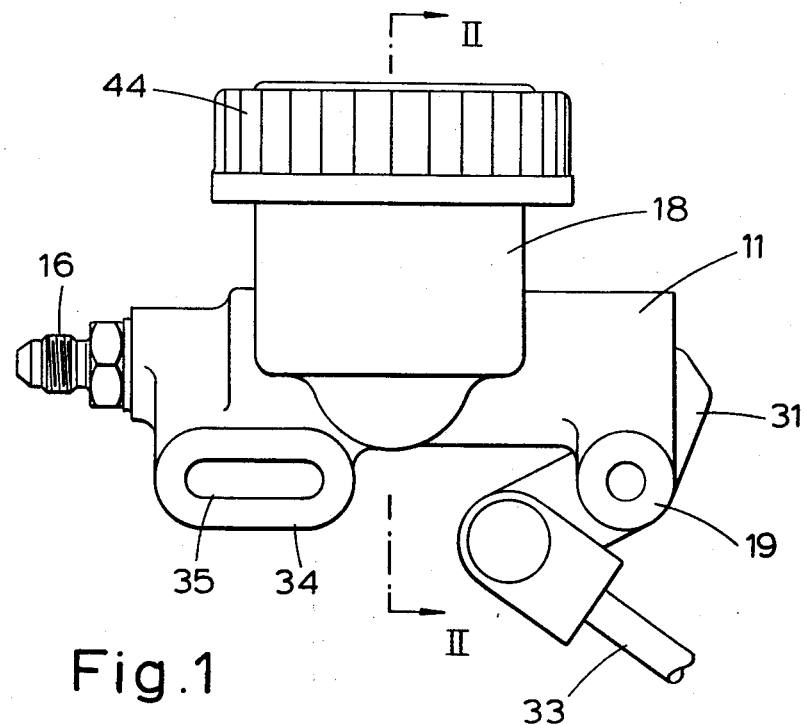
FIG. 1 is an elevation of a hydraulic reservoir and master cylinder assembly according to this invention.
Figure 2:
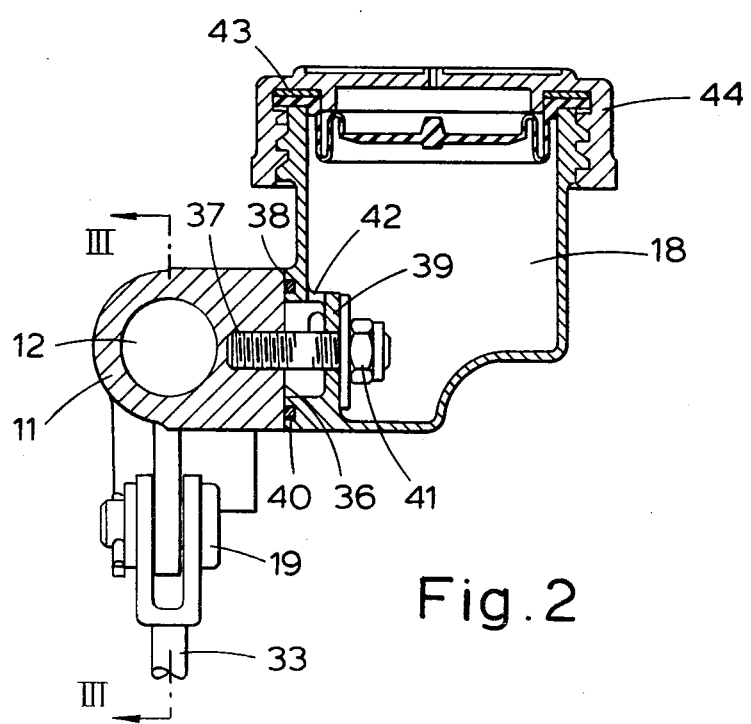
FIG. 2 is a section on the line II—II of FIG. 1.
Figure 3:
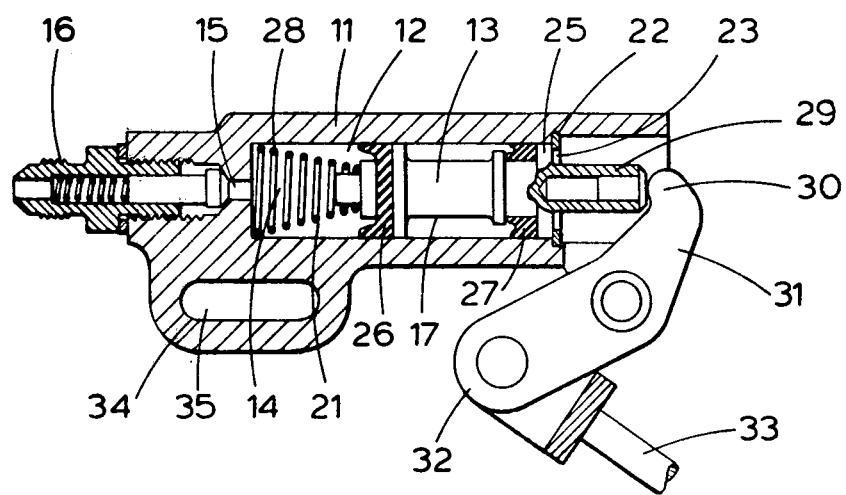
FIG. 3 is a section on the line III—III of FIG. 2.

With reference to FIGS. 1 to 3, a hydraulic master cylinder body 11 has an axial blind bore 12 in which a spool shaped piston 13 is sealingly reciprocable. The piston 13 divides the bore 12 into two chambers. The first chamber 14 is connected via a passageway 15 in the blind end wall 28 of the bore 12 and trap valve 16 with a hydraulic motor cylinder (not shown) e.g. the hydraulic cylinder of a disc brake. The second chamber 17 is formed as an annular space between the two larger diameter portions 24 and 25 of the piston 13.

The two larger diameter portions 24 and 25, each carry seals 26 and 27, respectively, on that side face thereof that forms the boundary of the first and second chamber, 14 and 17, respectively. A compression spring 21 acts between the end wall 28 and the piston 13 so as to bias the piston against a circlip 22 adjacent the mouth 23 of the bore 12.

Recuperation passages (not shown) but known per se, connect the first and second chambers, 14 and 17, with the fluid reservoir 18.

The larger diameter portion 25 of the piston 13 has an axial projection 29, on that side face away from the second chamber 17, which provides an abutment for the end portion 30 of a lever 31 which pivots about an axially off-set bracket 19, integral with the master cylinder body and adjacent the mouth 23. The other end portion 32 of the lever 31 provides an attachment for a cable 33 from a brake pedal (not shown).

During operation of the brake, the end portion 32 of the lever 31 is pulled away from the master cylinder body 11, and the lever 31 pivots about the bracket 19 so that the end portion 30 pushes the piston 13 towards the trap valve 16 so as to displace hydraulic fluid from the chamber 14 into the brake system.

The master cylinder body 11 carries a second integral bracket 34 adjacent the trap valve 16, which is off-set on the same side as the bracket 19. The bracket 34 has an elongated aperture 35 for attachment to the frame of a motor cycle. The elongated aperture 35 will allow for a degree of flexibility in the manner in which the master cylinder is fitted to the motor cycle frame.

The master cylinder body also has a machined planar face 36 on its outer surface, located between the two brackets, 19 and 34, arranged so that the face 36 is parallel to a plane defined by the longitudinal axis of the master cylinder and the line joining the two brackets 19 and 34. This face 36 provides a seat for the reservoir to seal against.

The fluid reservoir 18, is cylindrical in shape and is attached by a recessed planar face 38, formed on its sidewall adjacent the base of the reservoir. A stud 37 is screwed into the centre of the face 36 and is normal thereto and passes through the centre 39 of the recessed face 38 of the reservoir and is utilised for bolting the reservoir to the master cylinder body. A circular seal 40 seals the periphery of the face 38 against the machined face 36 on the surface of the master cylinder. A passageway 42 in the wall of the reservoir provides a fluid flow path from the reservoir into the recess in the face 38 and then fluid flows via the recuperation passages into the master cylinder.

The reservoir can be re-orientated with respect to the longitudinal axis of the master cylinder by slackening the nut 41 on the stud 37 and turning the reservoir through an arc in a plane parallel to that previously defined.

when fitting the master cylinder to the angled frame of the rear portion of a motor cycle, the body of the master cylinder is orientated in a particular attitude necessitated by the fitment. Thus the reservoir may not be upright, and it is then necessary to re-orientate the rservoir in the manner described to return the reservoir to an upright attitude. The nut 41 securing the reservoir is then tightened and the system filled with hydraulic fluid.

The reservoir cap 42 and rubber diaphragm 43 are then fitted to the reservoir so as to keep the fluid sealed therein.

Figure 4:
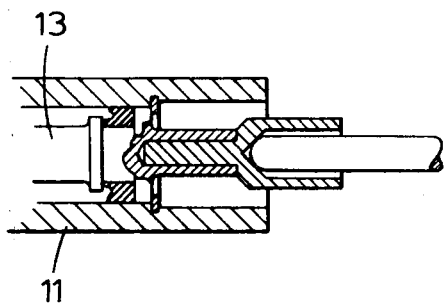
FIG. 4 is a similar view as in FIG. 3 which shows a modified push rod mechanism.

FIG. 4 shows an alternative in-put mechanism in which the cable and levers have been replaced by a push-rod.

Figure 5:
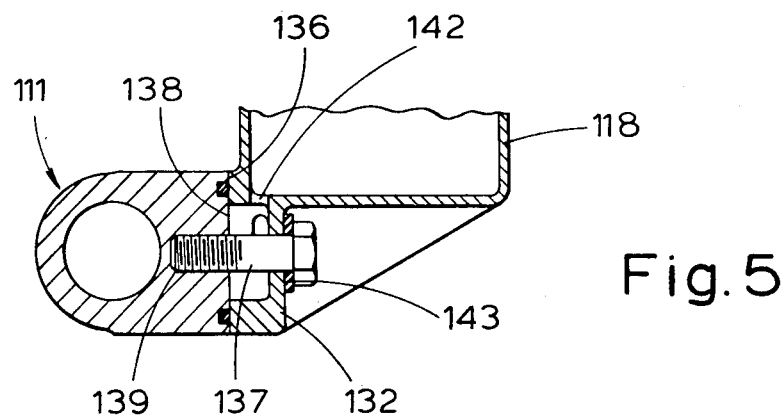
FIG. 5 is a section similar to FIG. 2 showing a modified means of attachment of the reservoir to the master cylinder.

FIG. 5 shows an alternative way of securing the fluid reservoir to the master cylinder body 111. The machined face 136 as previously described has a screw threaded central hole 139 which receives a bolt 137 which secures the reservoir to the master cylinder 111. The head of the bolt 137 is readily accessible from the exterior of the reservoir.

The base of the reservoir 118 carries an extension 132 having a recessed planar face 138 which seals against the machined face 136. The bolt 137 is arranged to clamp the extension 134 against the face 136 and passes through the centre of the recess. The head of the bolt is sealed against the extension by a gasket 143. A passageway 142 provides a fluid path from the reservoir to the recess.

The tank is re-orientated by slackening the bolt 137 and turning the rotating tank about the bolt 137.

Figure 6:
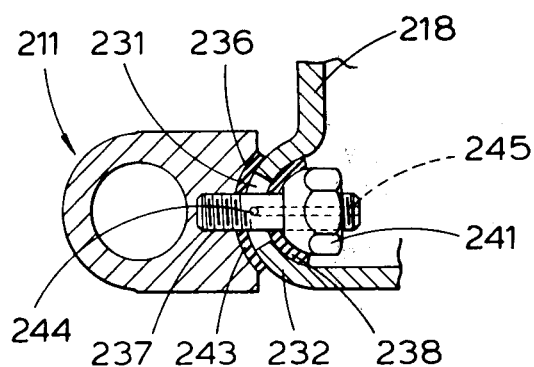
FIG. 6 is a similar section to FIG. 5 showing another means of attachment of the reservoir to the master cylinder.

FIG. 6 shows another arrangement for fixing the reservoir 218 to the master cylinder body 211 which allows multi-directional movement. The master cylinder body has a hemi-spherical seat 236 on its side which has a stud 237 projecting away from the master cylinder.

The reservoir 218 has a projection 232 with a like hemi-spherical surface which engages with the surface 236. The projection 232 forms part of the reservoir housing, and a shaped gasket 243 seals the projection 232 to the master cylinder.

An aperture 231 in the wall of the hemi-spherical projection 232 provides a chamber for feeding fluid into the master cylinder via recuperation ports (not shown but known perse). The stud 237 is a large clearance fit in the aperture 231 and the reservoir is secured in position by a hemi-spherical washer 238 and co-operating hemi-spherical headed nut 241, the arrangement being that the portion of the projection surrounding the aperture 231 is gripped between the washer 238 and the seat 236 on the master cylinder.

The chamber formed in the aperture 231 between the washer 138 and the gasket 243 is supplied to the fluid from the reservoir via radial and axial passageways 244 and 245, respectively, in the stud 237.

The reservoir is re-orientated by slackening off the nut 241 and this allows for a large degree of rotational movement about the axis of the strut 237 and also a lesser degree of rotational movement about both axes perpendicular to the axis of the stud.

Figure 7:
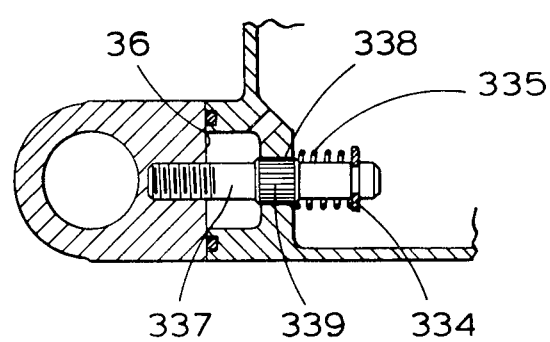
FIG. 7 is yet another means of attachment of the reservoir to the master cylinder.

FIG. 7 shows a method of securing the reservoir to the master cylinder body that is very similar to that shown in FIG. 2 except that the screw threaded stud 37 in FIG. 2 has been replaced by a stud 337, screwed into the machined face 36 on the body of the reservoir, which has a series of axial serrations 339 on its outer surface. These serrations 339 co-operate with "moulded-in" serrations 338 on the reservoir to prevent rotation of the tank around the stud 337. The tank is held axially in position on the serrations by a spring 335 which acts between a circlip 334, on the end portion of the stud 337 away from the surface 36, and the inside surface of the reservoir so as to bias the reservoir against the surface 36.

The reservoir is re-orientated about the stud 337 by pulling the reservoir away from the master cylinder against the bias of the spring and turning to the angle required and relocating the reservoir on the nearest serration.

We claim:

1. A motor vehicle hydraulic reservoir and master cylinder assembly having:
   a hydraulic master cylinder;
   a reservoir mounted directly onto the master cylinder;
   a mounting means on the master cylinder for mounting said cylinder onto a vehicle without the limitation of maintaining a reservoir in an upright position; and
   an adjustable means securing the reservoir to the master cylinder, so that the attitude of the reservoir can be selectively adjusted so as to ensure that the reservoir is substantially upright on the vehicle.

2. An assembly as claimed in claim 1 having a seat on the master cylinder on which the reservoir is rotatably adjustable and said seat is sealed for a fluid connection between the reservoir and master cylinder.

3. An assembly as claimed in claim 2, wherein said adjustable means is a screw threaded means the adjustment of which facilitates re-orientation of the reservoir, and said screw threaded means is directly attached to the seat on the master cylinder body.

4. An assembly as claimed in claim 2, wherein the attitude of the reservoir is adjustable only in discrete steps such that the given selected discrete step results in a substantially upright reservoir.

5. An assembly as claimed in claim 4, wherein the reservoir is secured to the master cylinder by a stud having axially aligned serrations on the outer surface thereof that co-operates with like serrations on the reservoir so as to prevent rotation of the reservoir about the stud whilst still allowing the reservoir to move along the axis of the stud and the reservoir is biased against the seat by a spring acting between the stud and the reservoir, such that movement of the reservoir against the spring bias disengages said serrations and said like serrations thus enabling the reservoir to rotate about the stud.

6. An assembly as claimed in claim 2, wherein said seat comprises a flat planar face parallel with the longitudinal axis of the cylinder, and the attitude of the reservoir is altered by rotation of the reservoir about an axis normal to the face.

7. An assembly as claimed in claim 3, wherein said seat comprises a hemi-spherical surface co-operating with a like surface on the reservoir and permitting to a limited extent universal angular adjustment of the reservoir relative to the master cylinder.

* * * * *